(12) United States Patent
Augustinowicz

(10) Patent No.: US 9,697,453 B2
(45) Date of Patent: Jul. 4, 2017

(54) WIRELESS DEVICE SECURITY SYSTEM

(71) Applicant: Identity Stronghold, LLC, Englewood, FL (US)

(72) Inventor: Walter P. Augustinowicz, Englewood, FL (US)

(73) Assignee: Identity Stronghold, LLC, Englewood, IL (US)

( * ) Notice: Subject to any disclaimer, the term of this patent is extended or adjusted under 35 U.S.C. 154(b) by 105 days.

(21) Appl. No.: 14/202,206

(22) Filed: Mar. 10, 2014

(65) Prior Publication Data

US 2015/0077229 A1     Mar. 19, 2015

Related U.S. Application Data

(60) Provisional application No. 61/878,889, filed on Sep. 17, 2013.

(51) Int. Cl.
*G06K 7/10* (2006.01)
*G06K 19/073* (2006.01)

(52) U.S. Cl.
CPC ... *G06K 19/07327* (2013.01); *G06K 7/10257* (2013.01); *G06K 19/07309* (2013.01); *G06K 19/07318* (2013.01)

(58) Field of Classification Search
CPC ....... G06K 19/07327; G06K 19/07741; G06K 19/005; G06K 19/077; G06K 7/10257; H04K 3/00; A45C 2011/186
USPC ......................................... 150/147; 340/10.1
See application file for complete search history.

(56) References Cited

U.S. PATENT DOCUMENTS

| 211,725 | A | | 1/1879 | Foster |
| 638,561 | A | | 12/1899 | Cook |
| 915,124 | A | | 3/1909 | Sprague |
| 6,121,544 | A | * | 9/2000 | Petsinger ............. G06K 19/005 150/147 |
| 7,635,089 | B2 | * | 12/2009 | Augustinowicz G06K 19/07327 235/486 |
| 2004/0129785 | A1 | | 7/2004 | Luu |
| 2005/0189425 | A1 | | 9/2005 | Itou |

(Continued)

FOREIGN PATENT DOCUMENTS

| JP | 2003099742 | 4/2003 |
| WO | WO2004036495 | 4/2004 |

OTHER PUBLICATIONS

European Patent Office Search Report for European Serial No. 12826259.9; Original Search Completed Feb. 5, 2015; Received and Printed on Aug. 27, 2015.

(Continued)

*Primary Examiner* — Yong Hang Jiang
(74) *Attorney, Agent, or Firm* — Neustel Law Offices

(57) ABSTRACT

A wireless device security system for preventing the unauthorized reading of wireless devices by a reader. The wireless device security system generally includes a device holder that is adapted to receive a wireless device for storage, access and removal. The device holder includes an interference tag that interferes with the wireless communications between the wireless device and a reader when the wireless device is positioned at least partially within the device holder. The device holder preferably includes a layer of shielding material adjacent to or near the wireless device during storage to further prevent unauthorized wireless communications with a reader.

20 Claims, 19 Drawing Sheets

(56) References Cited

U.S. PATENT DOCUMENTS

| | | |
|---|---|---|
| 2006/0044206 A1 | 3/2006 | Moskowitz |
| 2006/0187055 A1 | 8/2006 | Colby |
| 2006/0187061 A1* | 8/2006 | Colby .................. G06K 19/025 340/572.8 |
| 2007/0108296 A1* | 5/2007 | Konopka ........... G06K 7/10178 235/492 |
| 2007/0150336 A1* | 6/2007 | Boily ..................... G07B 15/00 705/13 |
| 2007/0289775 A1 | 12/2007 | Potts |
| 2008/0190526 A1* | 8/2008 | O'Shea ............ G06K 19/07327 150/147 |
| 2008/0308640 A1 | 12/2008 | Chien |
| 2011/0272464 A1 | 11/2011 | Rancien |
| 2012/0112887 A1* | 5/2012 | Horne .............. G06K 19/07336 340/10.1 |
| 2014/0203020 A1* | 7/2014 | Trombino .............. A45C 11/00 220/500 |

OTHER PUBLICATIONS

PCT Search Report Received on Feb. 23, 2015 from the Korean Intellectual Property Office.
http://www.alldatasheet.com/datasheet-pdf/pdf/255413/ATMEL/ATA5577.html; Data Sheet from Atmel for the Read/Write LF RFID IDIC 100 to 150 kHz; Received and Printed on Mar. 4, 2014.

* cited by examiner

WIRELESS DEVICE SECURITY SYSTEM

CROSS REFERENCE TO RELATED APPLICATIONS

I hereby claim benefit under Title 35, United States Code, Section 119(e) of U.S. provisional patent application Ser. No. 61/878,889 filed Sep. 17, 2013. The 61/878,889 application. The 61/878,889 application is hereby incorporated by reference into this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to wireless devices and more specifically it relates to a wireless device security system for preventing the unauthorized reading of wireless devices.

Description of the Related Art

Any discussion of the related art throughout the specification should in no way be considered as an admission that such related art is widely known or forms part of common general knowledge in the field.

1. Wireless Devices and Readers.

Wireless communication technologies such as radio-frequency identification (RFID) and near field communication (NFC) utilize radio waves to wirelessly transfer data from a wireless device to a reader in a contactless manner.

There are various types of wireless devices in use today that utilize wireless communications such as RFID and NFC. Examples of wireless devices include but are not limited to proximity cards, passive cards, active cards, smart cards (with or without contacts), security cards, identification badges or identification cards, passports, payment devices, electronic devices and smartphones.

Smart cards are also sometimes referred to as chip cards or integrated circuit cards (ICC). Smart cards may or may not include contact pads for providing electrical connectivity with another device to provide a second path of communication in addition to wireless communication. Smart cards may not include contacts. Smart cards are useful for various types of applications including identification, authentication, data storage and application processing.

A reader may be comprised of various types of electronic devices adapted for receiving radio signals from wireless devices such as a passive reader or an active reader, wherein an active reader also transmits radio signals to be received by the wireless device.

2. Tags in Wireless Devices.

The wireless device includes a "tag" (a.k.a. transponder, RFID tag, NFC tag) that stores data and wirelessly communicates with the reader via radio-frequency electromagnetic fields in either a unidirectional communication manner or a bi-directional communication manner. Tags may also be comprised of a read/write configuration that are programmable by the reader.

Tags typically communicate with readers via low frequency (LF), high frequency (HF) or ultra-high frequency (UHF) signals. For example, LF signals are typically in the 120 kHZ-150 kHz band (e.g. 125 kHz or 134 kHz for LF RFID tags), HF signals are typically in the 3 MHz-30 MHz band (e.g. 13.56 MHz for HF RFID tags) and UHF signals are typically in the 300 MHz-3 GHz band (e.g. 433 MHz for UFH RFID tags).

A tag is comprised of an integrated circuit and an antenna connected to the integrated circuit. An active tag includes a battery to provide electrical power and a passive tag includes a capacitor to store energy received from the radio signal of the reader. The tag may be comprised of various tag technologies such as an RFID tag or an NFC tag.

The integrated circuit in the tag is for storing and processing information, modulating and demodulating a radio-frequency (RF) signal, collecting DC power from the reader signal and other functions. The integrated circuit includes memory to store various types of data (e.g. identification data, security access data, payment data). The integrated circuit also includes either a chip-wired logic or a programmed (or programmable) data processor for processing data received and to be sent.

The antenna in the tag is for receiving a radio signal from a reader and/or transmitting a radio signal to the reader. With a passive tag technology, the antenna also provides electrical power to the integrated circuit which does not include a battery via magnetic induction between the antenna and the reader located within each other's near field.

3. Types of RFID Technology.

There are three main types of RFID technology: active, semi-passive and passive. Active RFID tags utilize a battery to broadcast radio waves containing data. Semi-passive RFID tags utilize a smaller battery than active RFID tags to keep the RFID tag "awake" but still rely upon a reader to provide power for broadcasting radio waves. Passive RFID tags are completely reliant upon an external RFID reader to provide the power to broadcast radio waves containing the data. Active RFID tags can transmit radio waves that may be read at ranges of 300 feet or more. Passive RFID tags can transmit radio waves that may be read at ranges of 20 or more feet. Passive RFID tags are the most common RFID tag because of they are relatively inexpensive compared to active and semi-passive RFID tags.

Passive RFID tag systems have two main components: an RFID reader and an RFID tag. The RFID reader has a reader antenna that transmits radio waves that are received by an RFID antenna within the passive RFID tag. The radio waves received by the passive RFID tag are converted to electrical power and then used by the RFID tag to transmit radio waves containing data that are then detected by the RFID reader. The RFID reader then communicates the data received from the RFID tag via the radio waves to another device (e.g. computer) for processing.

4. Unauthorized Reading of Wireless Devices.

Unfortunately, RFID tags and NFC tags, particularly passive RFID tags, are susceptible to unauthorized reading (a.k.a. "skimming") where an unauthorized reader communicates with the tag by merely being in close proximity to the tag. Important data such as credit card data, identity data and personal data may be lost to unscrupulous individuals via the unauthorized reading of wireless devices such as RFID credit cards. To make matters worse for users, tags within the wireless devices do not need to be physically seen to transmit the data contained on the tag so a smart card in a wallet can still be scanned by an unauthorized reader.

5. Conventional Solutions to Prevent Unauthorized Reading.

Recently, various shielding products have been produced to block radio waves from being received by and/or transmitted to the tags in wireless devices. The shielding products typically use a layer of metal that blocks the radio waves and/or detunes the tag. Examples of security products include shielded sleeves, shielded badge holders, shielded wallets, shield bags and other devices that include an electromagnetic shield that prevents or significantly reduces the ability of the tag to communicate with a reader unless the wireless device is removed from the shielding device. U.S. Pat. No. 6,121,544 to Petsinger titled "Electromagnetic Shield to Prevent Surreptitious Access to Contactless Smartcards" illustrates a solution that utilizes an electromagnetic shield constructed of a magnetic alloy to shield a contactless smart card from electric field.

While conventional shielding products are capable of preventing the unauthorized reading of wireless devices using HF tags and UHF tags, they are not as suitable for preventing the unauthorized reading of wireless devices using LF tags due to the amount of shielding material required to effectively block a LF reader. For example, the amount of shielding material required may either be cost prohibitive and/or not acceptable for usage in the particular application for various reasons (e.g. added weight, ergonomics, flexibility).

Because of the inherent problems with the related art, there is a need for a new and improved wireless device security system for preventing the unauthorized reading of wireless devices.

BRIEF SUMMARY OF THE INVENTION

The invention generally relates to a wireless device security system which includes a device holder that is adapted to receive a wireless device for storage, access and removal. The device holder includes an interference tag that interferes with the wireless communications between the wireless device and a reader when the wireless device is positioned at least partially within the device holder. The device holder preferably includes a layer of shielding material adjacent to or near the wireless device during storage to further prevent unauthorized wireless communications with a reader.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
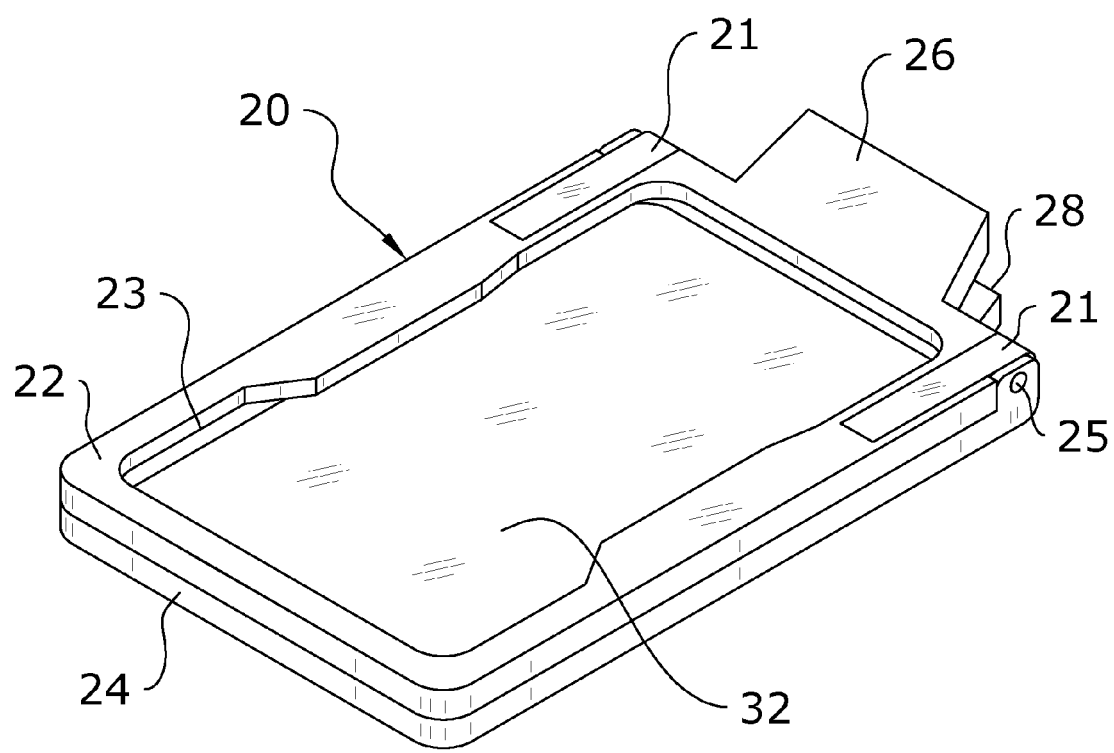
FIG. 1 is an upper perspective view of a device holder suitable for receiving a smart card such as an identification badge.
Figure 2A:
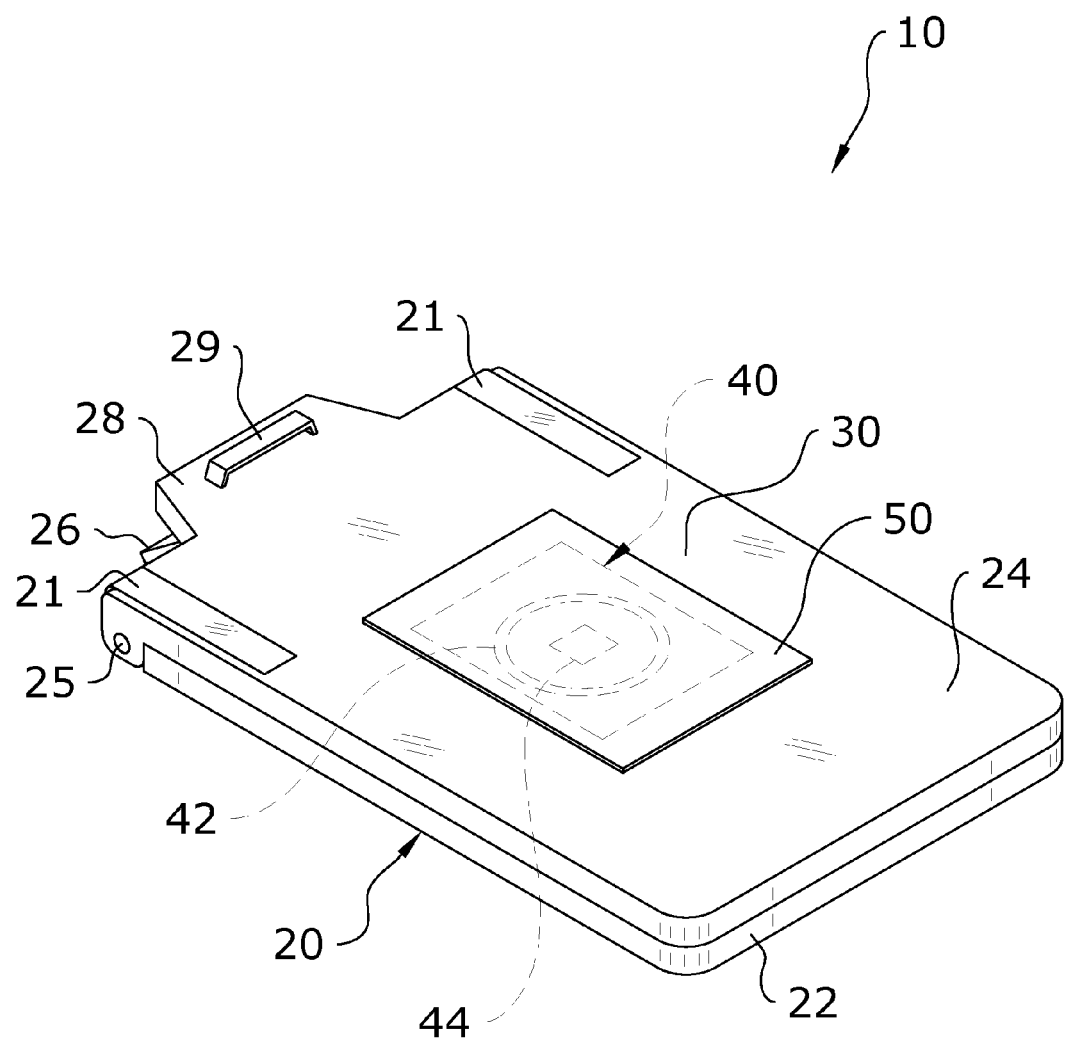
FIG. 2a is an upper perspective view of a rear portion of the device holder illustrating the interference tag attached to the exterior of the device holder in the closed state.
Figure 2B:
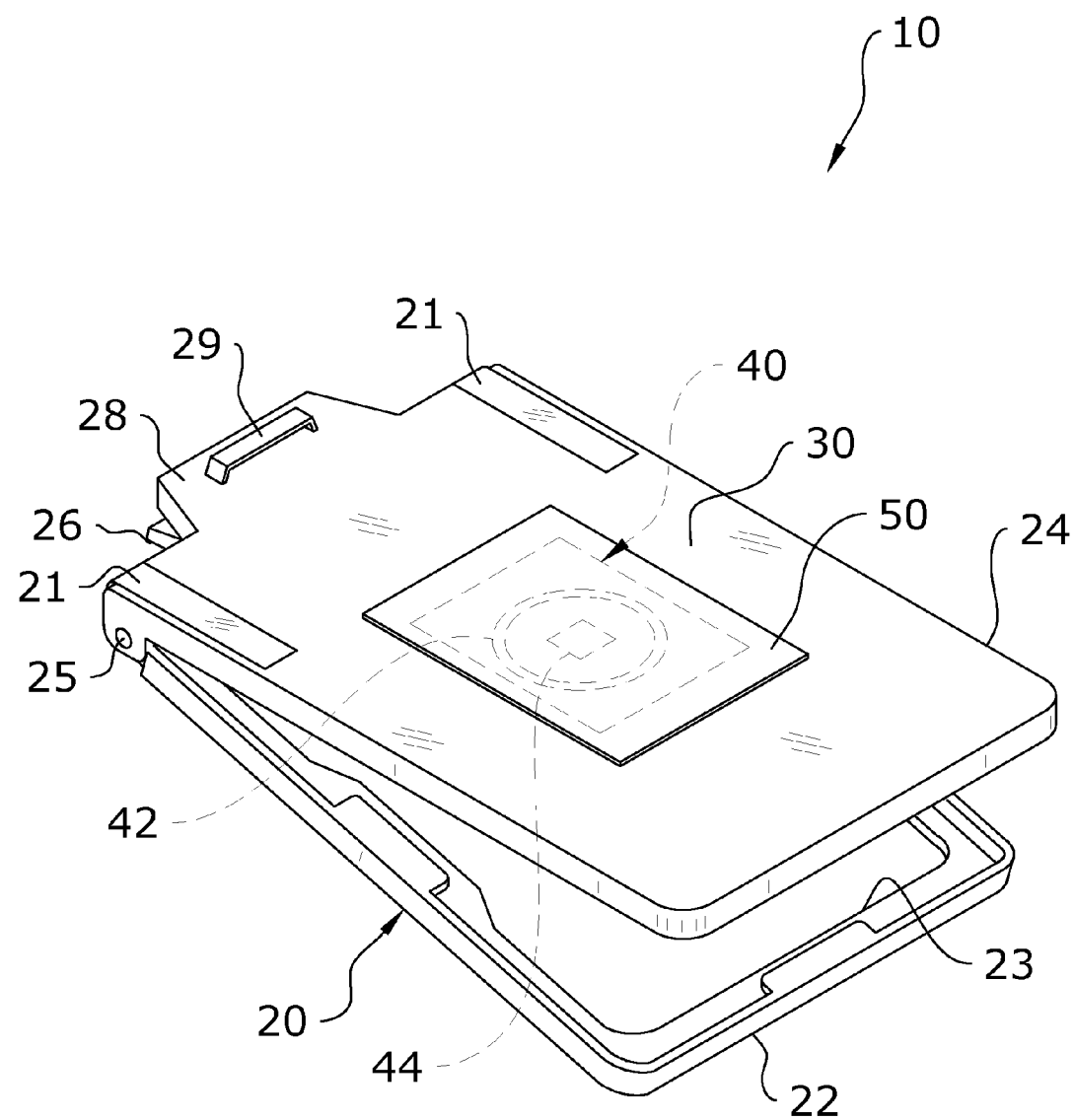
FIG. 2b is an upper perspective view of a rear portion of the device holder illustrating the interference tag attached to the exterior of the device holder in the opened state.

A. Overview.

Turning now descriptively to the drawings, in which similar reference characters denote similar elements throughout the several views, FIGS. 1 through 15 illustrate a wireless device security system 10, which comprises a device holder 20 that is adapted to receive a wireless device 14 for storage, access and removal. The device holder 20 includes an interference tag 40 that interferes with the wireless communications between the wireless device 14 and a reader 12 when the wireless device 14 is positioned at least partially within the device holder 20. The device holder 20 preferably includes a layer of shielding material 32 adjacent to or near the wireless device 14 during storage to further prevent unauthorized wireless communications with a reader 12. The present invention is effective in reducing unauthorized communications between a wireless device 14 that communicates via a low frequency, high frequency and/or ultra-high frequency signal.

B. Wireless Device.

Figure 6:
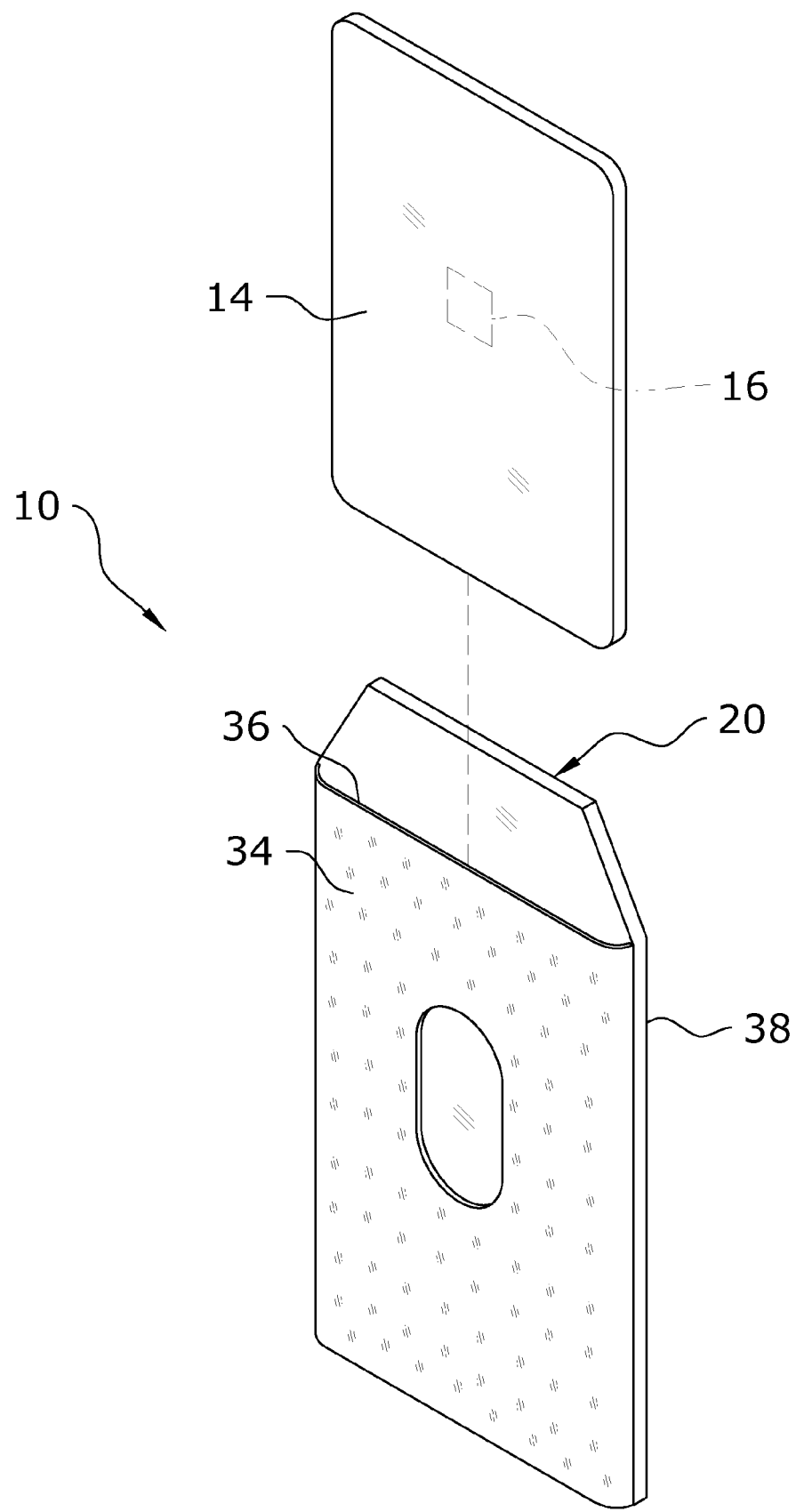
FIG. 6 is an exploded view of an alternative device holder having a pocket that receives the wireless device.
Figure 9:
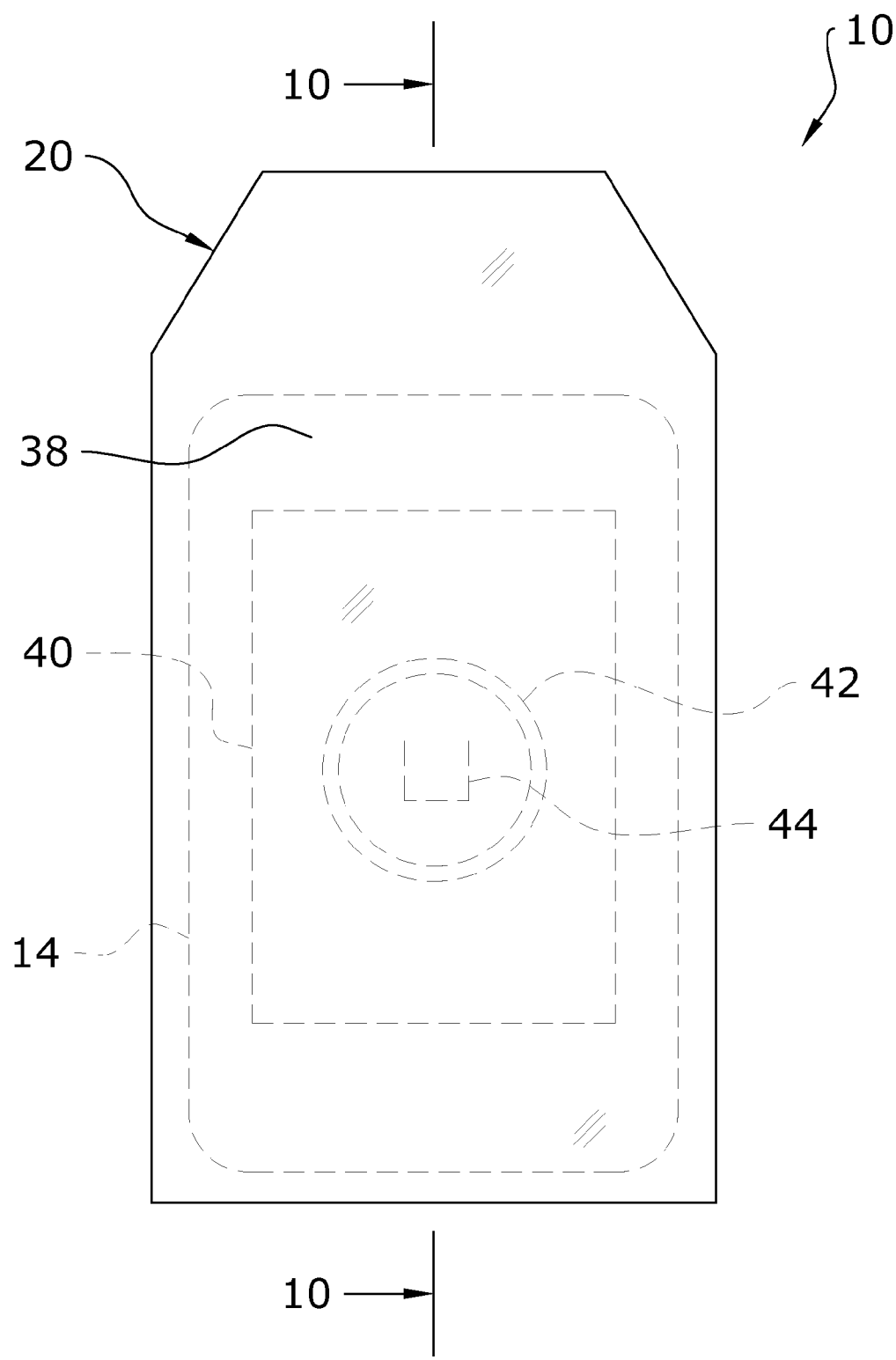
FIG. 9 is a rear view of the alternative device holder.

FIG. 6 illustrates a preferred embodiment of the wireless device 14 comprised of a card structure. Examples of wireless devices 14 having a card structure include but are not limited to smart cards with electrical contacts, smart cards without electrical contacts, smart cards with magnetic stripe, proximity cards, passive cards, active cards, identification cards, security cards, and payment cards such as a credit cards or debit cards. The card structure for the wireless device 14 is preferably comprised of a thin, flat structure that may be held within a wallet, sleeve or badge holder. In addition, the card structure for the wireless device 14 is further preferably comprised of a rectangular shaped structure as shown in FIGS. 6 and 9 of the drawings. It can be appreciated that the wireless device 14 may be comprised of non-card structure such as but not limited to passports, smartphones and other electronic devices. The wireless device 14 may be constructed from various types of materials such as but not limited to plastic.

As is well known in the art, the wireless device 14 includes a device tag 16 that wirelessly communicates with a reader 12 (a.k.a. scanner) via radio waves. In particular, the wireless device 14 is adapted to transmit a wireless data signal that is readable by the reader 12 when the wireless device 14 is positioned near a reader 12. The data signal may include various types of information (e.g. personal identification, account information, payment information, security privileges). The device tag 16 may be comprised of a unidirectional or bi-directional communication device. In addition, the device tag 16 may be comprised of various types of tag technologies such as but not limited to a radio-frequency identification (RFID) tag or a near field communication (NFC) tag.

As is further well known in the art, the device tag 16 is comprised of an integrated circuit electrically connected to an antenna. The device tag 16 may also have a battery or capacitor in electrical communication with the integrated circuit to provide electrical power.

The device tag 16 communicates with readers via the data signal having a frequency. The frequency of the data signal may be comprised of various frequencies such as a low frequency (LF), high frequency (HF) or ultra-high frequency (UHF) signal. For example, LF signals are typically in the 120 kHZ-150 kHz band (e.g. 125 kHz or 134 kHz for LF RFID tags), HF signals are typically in the 3 MHz-30 MHz band (e.g. 13.56 MHz for HF RFID tags) and UHF signals are typically in the 300 MHz-3 GHz band (e.g. 433 MHz for UFH RFID tags). The present invention is particularly suitable for blocking and/or interfering with device tags 16 that have a data signal in the low frequency band which shielding material 32 alone is difficult to accomplish with.

C. Device Holder.

The device holder 20 is adapted to removably receive the wireless device 14. The device holder 20 preferably includes a receiver portion 34 that receives, stores and allows for removal of the wireless device 14 therefrom. The device holder 20 may be comprised of various types of structures such as but not limited to a bag structure, passport holders, lanyard card holders, a pivoting badge holder (see FIGS. 1 through 5b), a sleeve structure (see FIGS. 6 through 10b), a wallet structure (see FIGS. 11a through 11b) and the like.

The device holder 20 preferably has a receiver portion 34 that is adapted to receive a wireless device 14. The receiver portion 34 is further preferably comprised of a structure that is adapted to allowing for the insertion, storage and removal of the wireless device 14 from the receiver portion 34 such as but not limited to a pocket with a receiver opening 36 as illustrated FIG. 6 of the drawings. The receiver portion 34 may be comprised of slots, clips and other structures capable of receiving, storing and allowing removal of the wireless device 14 from the device holder 20.

Figure 5A:
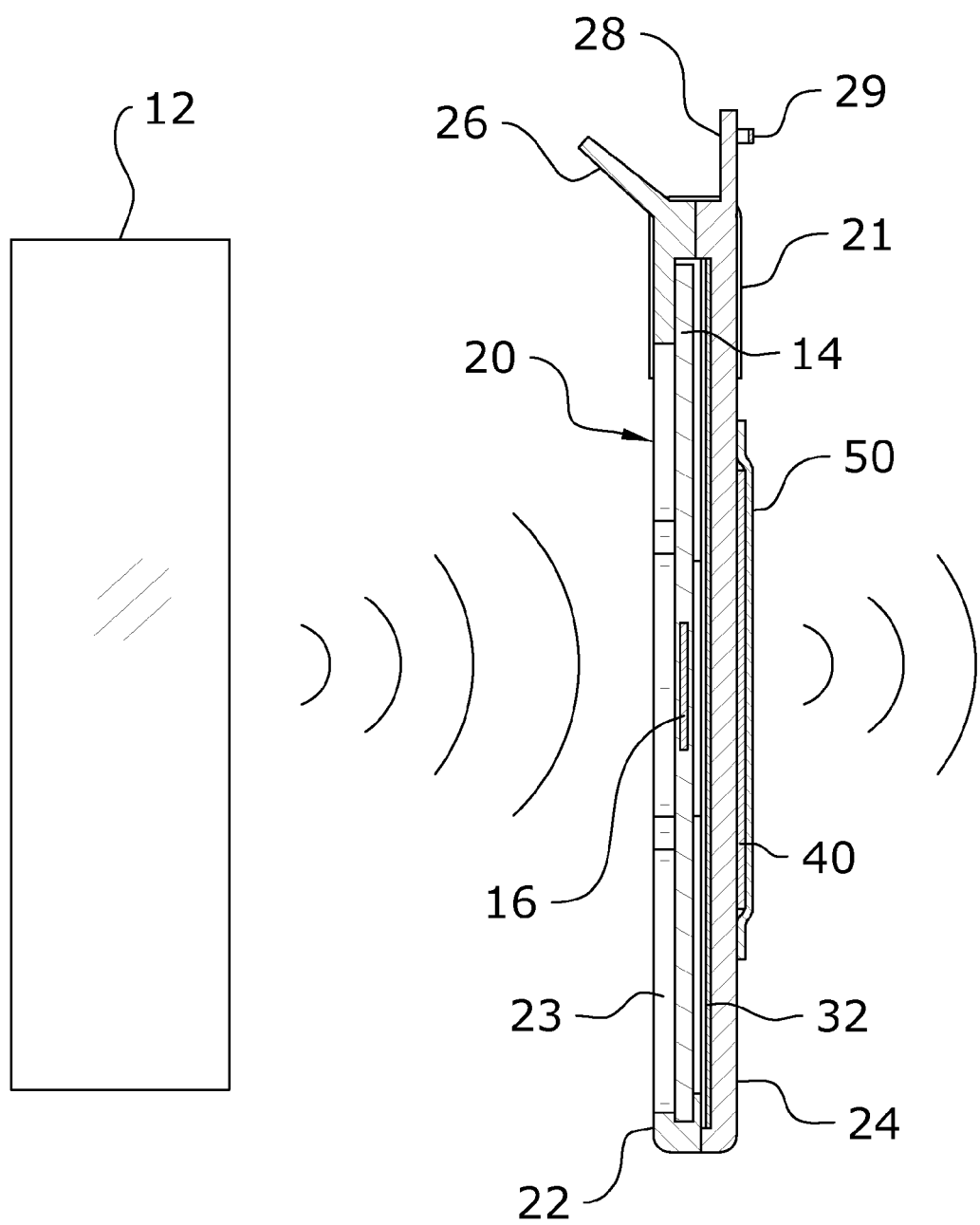
FIG. 5a is a cross sectional view taken along line 5-5 of FIG. 4 with the device holder in a closed state preventing communication between the wireless device and the reader.
Figure 5B:
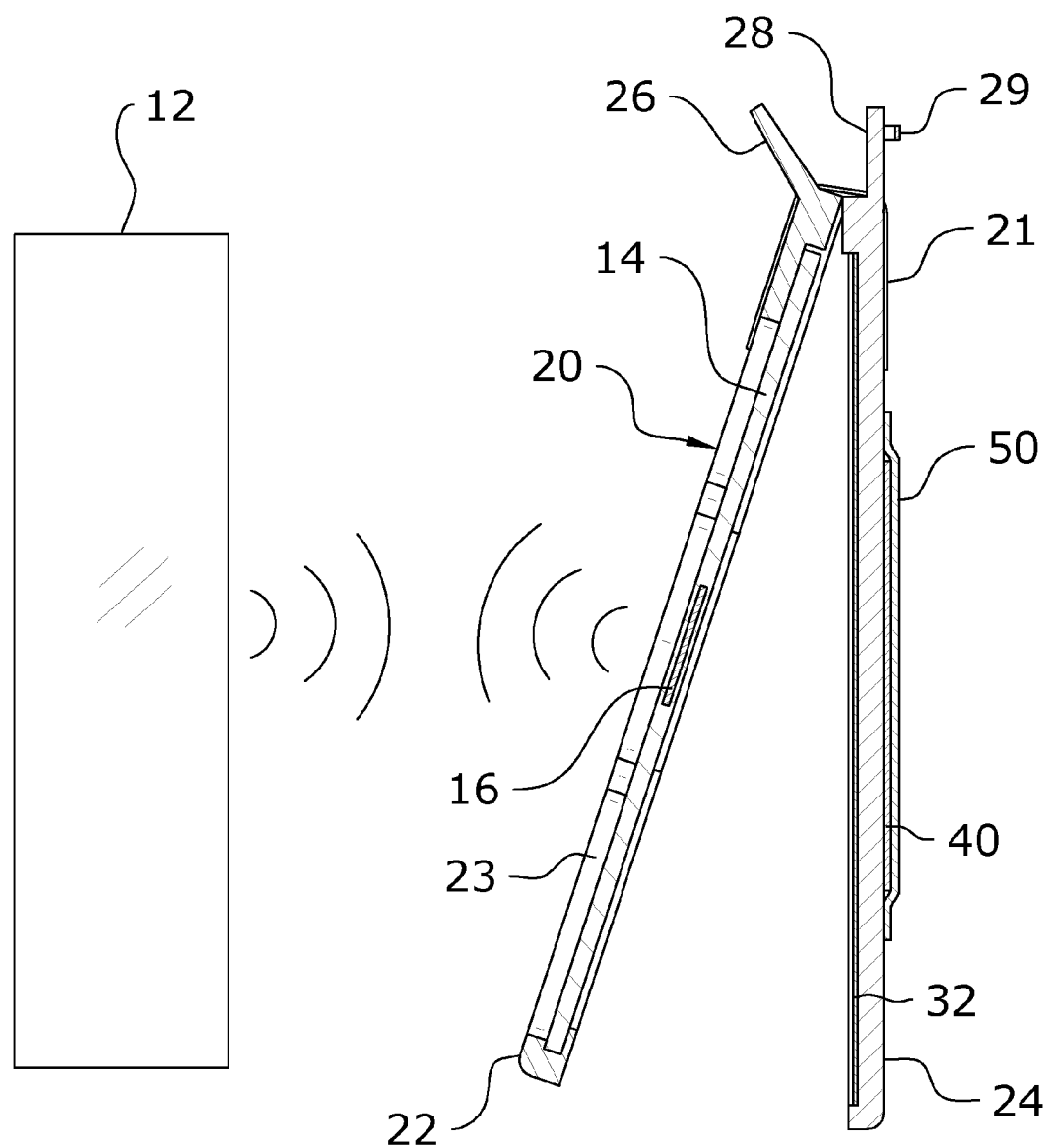
FIG. 5b is a cross sectional view taken along line 5-5 of FIG. 4 with the device holder in an open state so the wireless device is positioned away from the shielding material for communicating with a reader.

FIGS. 1 through 5b of the drawings illustrating a pivoting structure for the device holder 20 having a first portion 22 pivotally connected to a second portion 24 by a hinge 25. A loop member 29 may be attached to the exterior surface 30 of the second portion 24 to allow for attachment of a lanyard or other connecting structure. One or more bias members 21 (e.g. metal springs) applying a closing force to the first portion 22 and the second portion 24 of the device holder 20 to retain the device holder 20 in a closed state as shown in FIGS. 1, 2a and 5a of the drawings. A first handle 26 extends outwardly from the first portion 22 and a second handle 28 extends outwardly from the second portion 24 thereby allowing a user to manually open the device holder 20 which separates the wireless device 14 from the second portion 24 of the device holder 20 as illustrated in FIGS. 2b and 5b of the drawings. The first portion 22 may include a transparent window or a first opening 23 to allow for viewing of the wireless device 14 (e.g. a picture printed on the wireless device 14 such as an identification badge) as illustrated in FIG. 1 of the drawings. The first portion 22 further preferably is comprised of the receiver portion 34 of the device holder 20 wherein a plurality of tabs extending inwardly form receiver slots that slidably receive the wireless device 14 such as a proximity card, wherein the proximity card is inserted into the first portion 22 from one end of the device holder 20.

Figure 7:
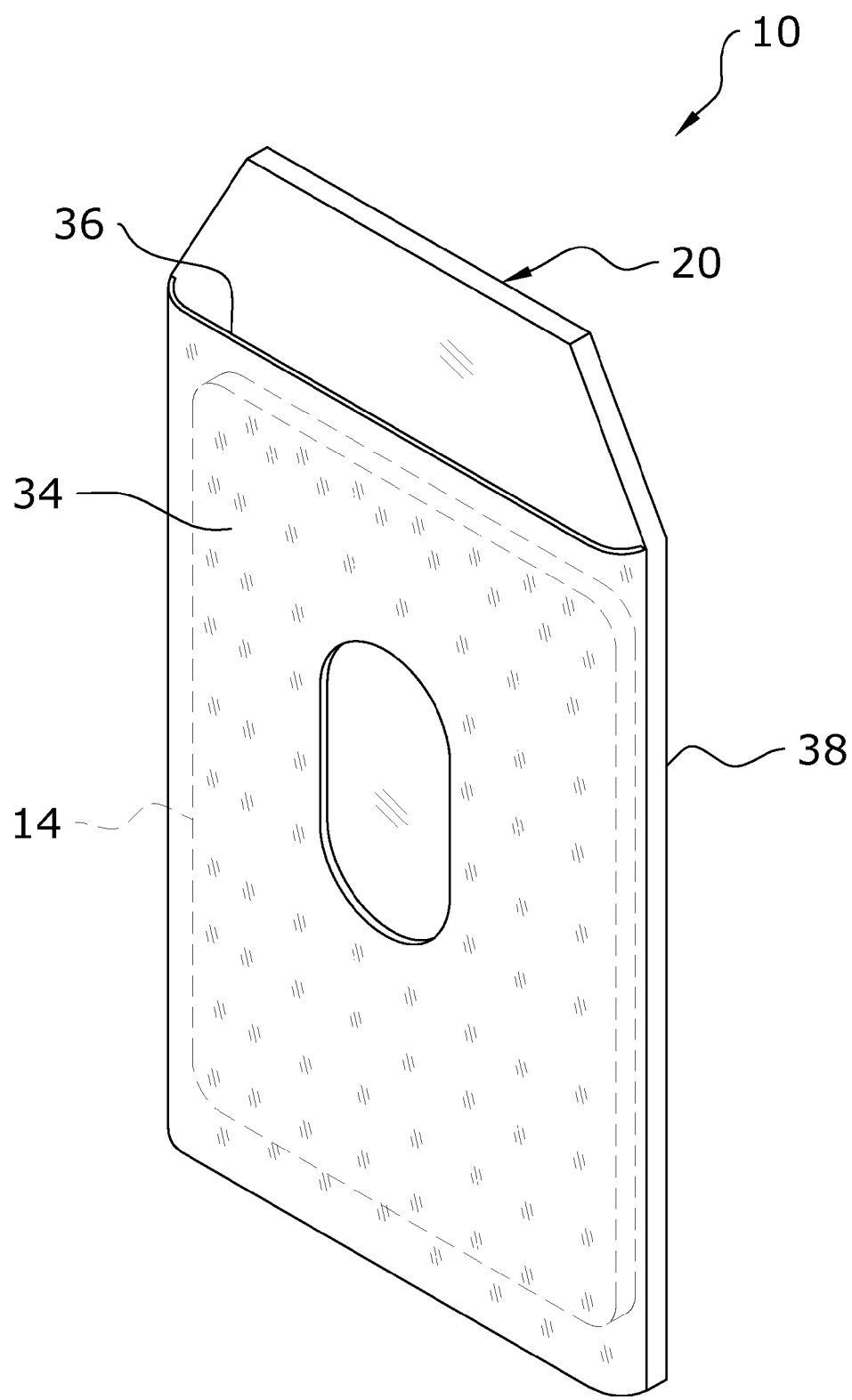
FIG. 7 is an upper perspective view of the alternative device holder with the wireless device positioned within the pocket preventing communication between the wireless device and the reader.
Figure 8:
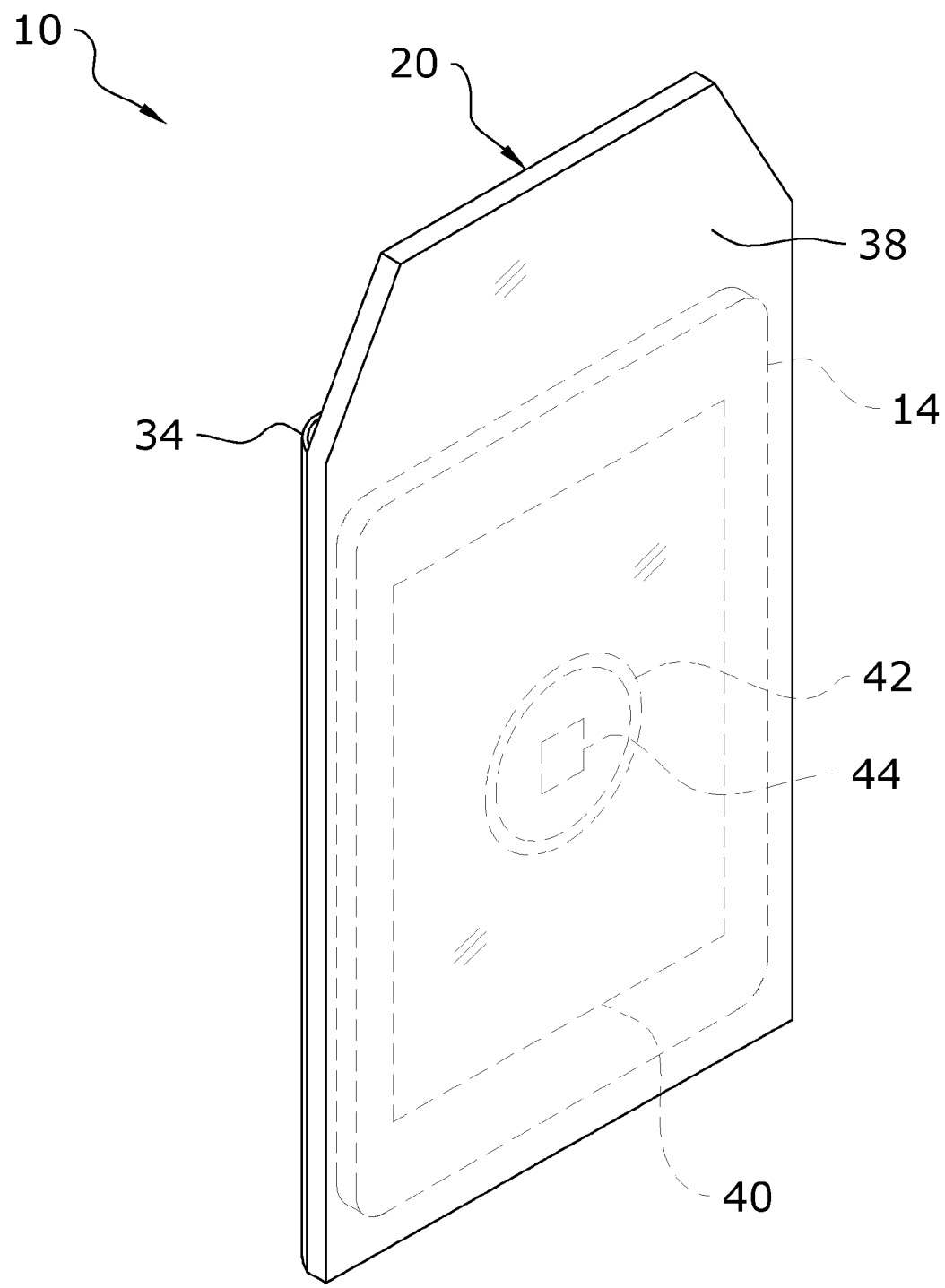
FIG. 8 is a rear upper perspective view of the alternative device holder.

As shown in FIGS. 6 through 13 of the drawings, the device holder 20 may have a back wall 38 for a sleeve, wallet or other structure that may be comprised of a rigid structure with the receiver portion 34 extending from a front face of the back wall 38 as illustrated in FIGS. 6 through 13 of the drawings. The back wall 38 may be comprised of various types of material such as but not limited to plastic, leather and the like. The receiver portion 34 may be comprised of a rigid material or flexible material that expands to snugly receive the wireless device 14. The receiver portion 34 may also include a front opening that allows a user to engage and remove the wireless device 14 from the receiver portion 34 as illustrated in FIGS. 6 and 7 of the drawings.

D. Shielding Material.

The device holder 20 preferably includes a shielding material 32 positioned near the receiver portion 34 to assist the interference tag 40 in preventing the unauthorized access of the device tag 16 within the wireless device 14. The shielding material 32 is preferably larger in size than the wireless device 14 to ensure that the shielding material 32 is adjacent to the device tag 16 when the wireless device 14 is positioned within the device holder.

The shielding material 32 is preferably comprised of a layer of metal which detunes the device tag 16 so the device tag 16 cannot absorb enough electromagnetic energy from the reader 12 to activate and reflects the data signal thereby causing a poor data signal read range for the reader 12, a phantom read by the reader 12 or no data signal at all. U.S. Pat. No. 6,121,544 to Petsinger titled "Electromagnetic Shield to Prevent Surreptitious Access to Contactless Smartcards" illustrates a solution that utilizes an electromagnetic shield constructed of a magnetic alloy to shield a contactless smart card from electric field and is hereby incorporated by reference in its entirety herein.

The usage of shielding material 32 requires the device tag 16 to be close to the shielding material 32 used with the closer the better. While the shielding material 32 may be embedded within the device holder 20, it is preferable that the shielding material 32 is attached to the interior wall of the receiver portion 34 (see FIG. 10a) or to the interior wall of the second portion 24 of the pivoting device holder 20 (see FIGS. 1, 5a, 5b) so that when the wireless device 14 is positioned within the receiver portion 34 of the device holder 20 the device tag 16 is close to the shielding material 32. It is further preferable that the wireless device 14 is adjacent to and/or touching the shielding material 32.

E. Interference Tag.

Figure 12:
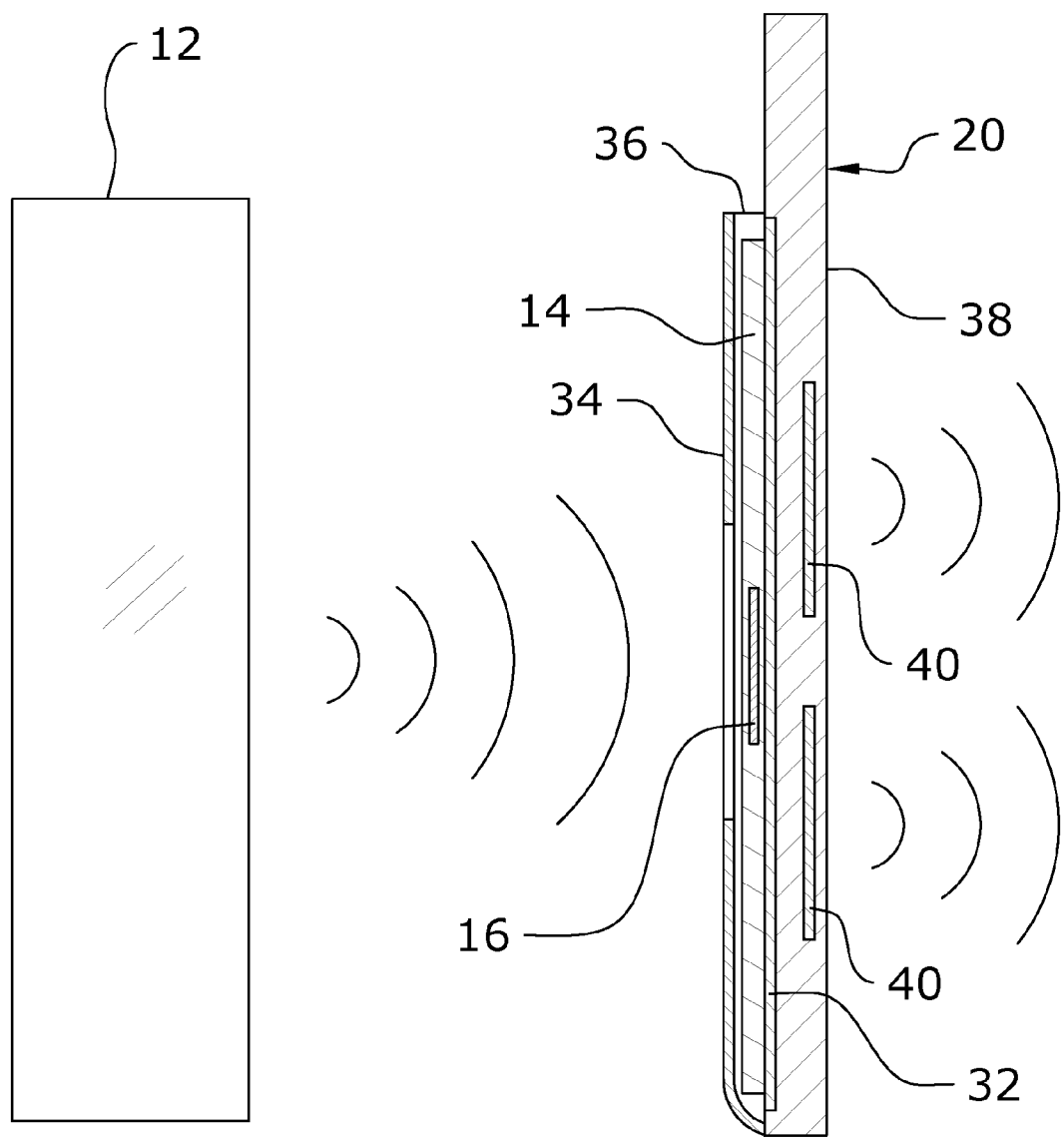
FIG. 12 is a side cutaway view of an alternative embodiment utilizing two interference tags.
Figure 13:
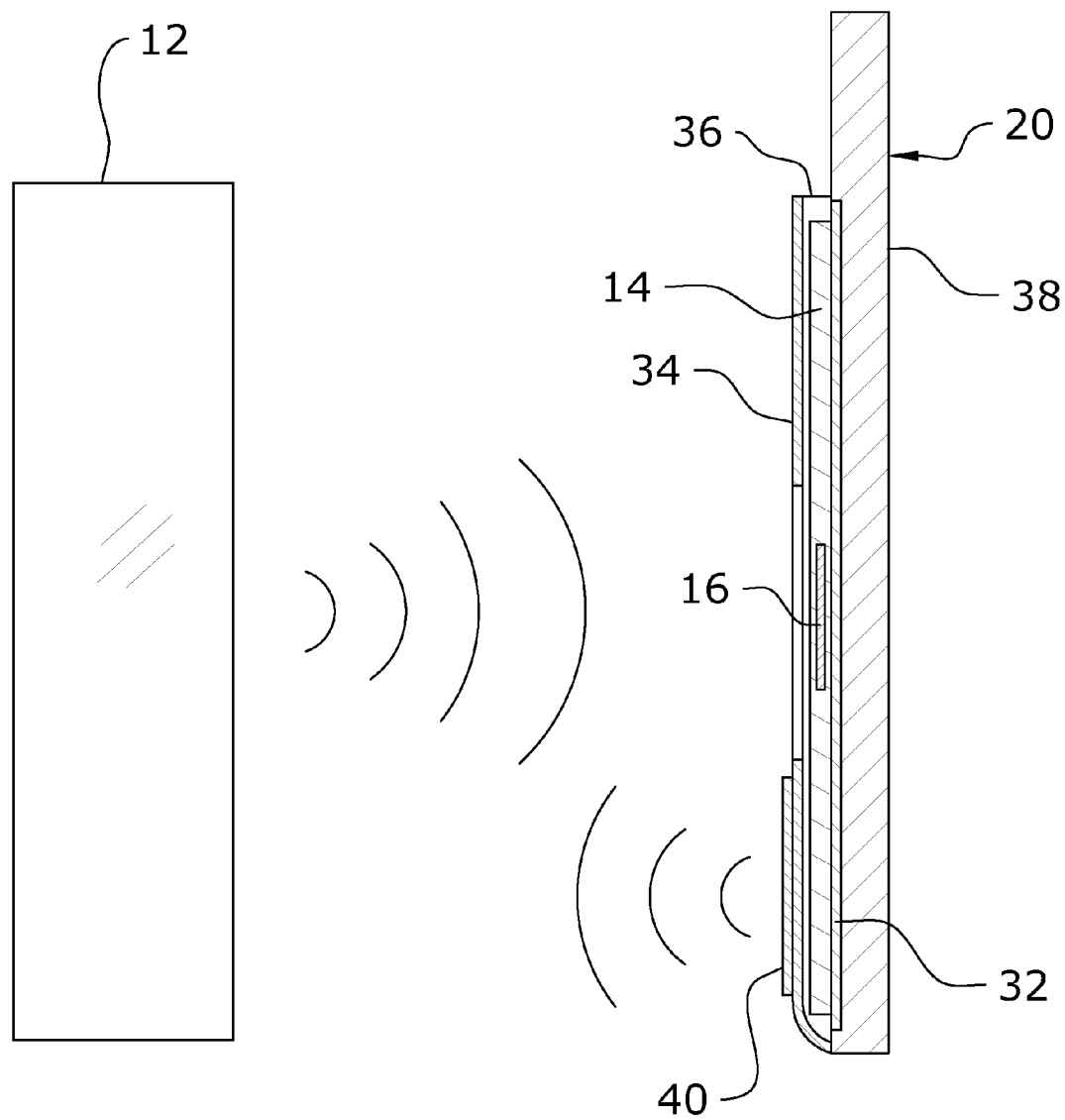
FIG. 13 is a side cutaway view of another alternative embodiment wherein the interference tag is positioned on the front of the device holder.
Figure 14:
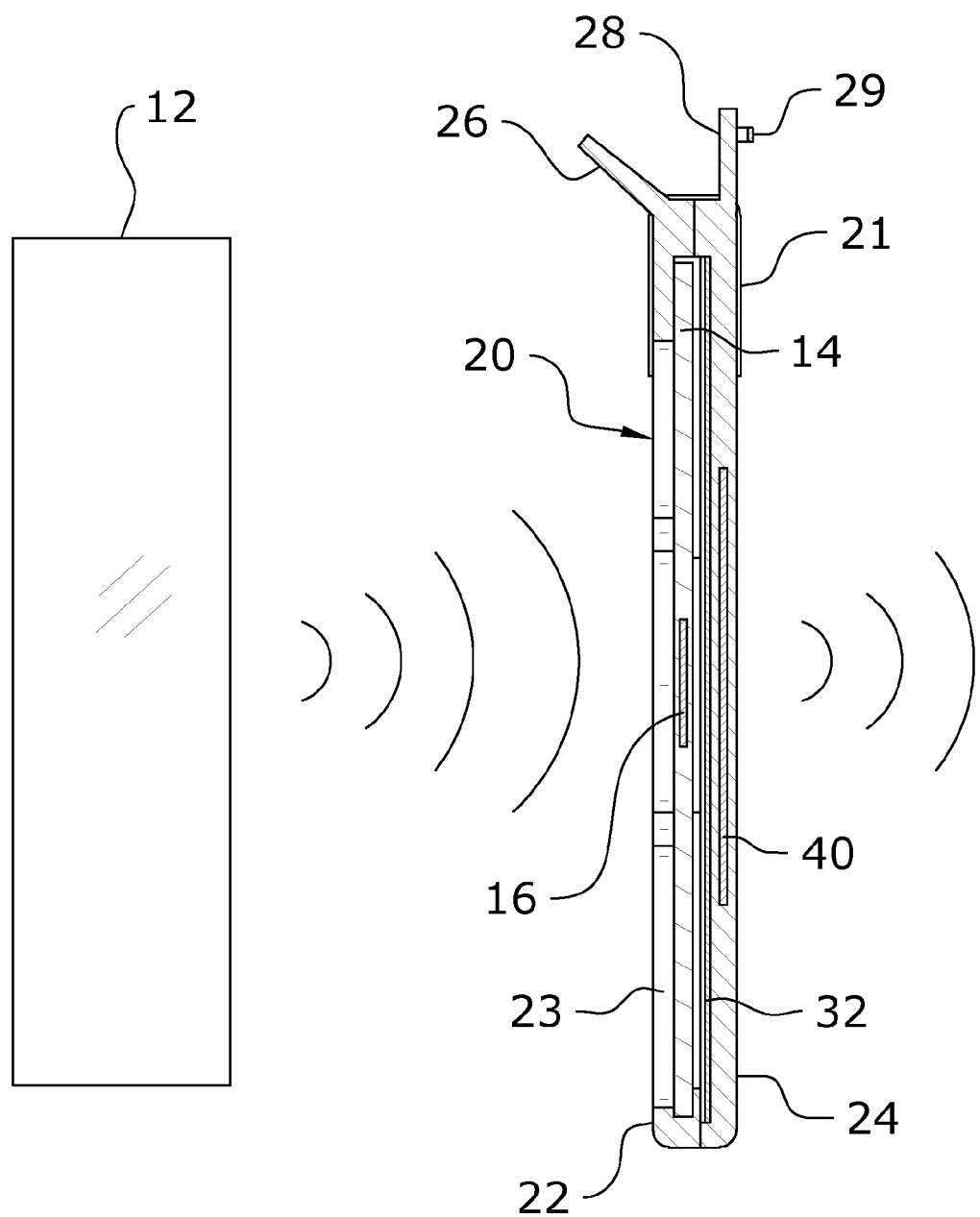
FIG. 14 is a side cutaway view of another alternative embodiment with the interference tag embedded within the device holder illustrated in FIGS. 1 through 4 of the drawings.

The interference tag 40 is connected to the device holder 20 by either embedding the interference tag 40 within a portion of the device holder 20 or attaching to an exterior surface 30 (front, back, interior, etc.) of the device holder 20. One or more interference tags 40 may be used on a single device holder 20 wherein FIG. 12 illustrates the usage of two interference tags 40.

The interference tag 40 may be attached to the device holder 20 in various manners (e.g. adhesive, lamination, etc.). The interference tag 40 is adapted to transmit an interference signal when close to the reader 12 such that the interference signal is detected by the reader 12 instead of the data signal from the device tag 16 within the wireless device 14 when the wireless device 14 is positioned within the device holder 20. The interference signal may be a low frequency signal, high frequency signal or an ultra-high frequency signal.

Figure 15:
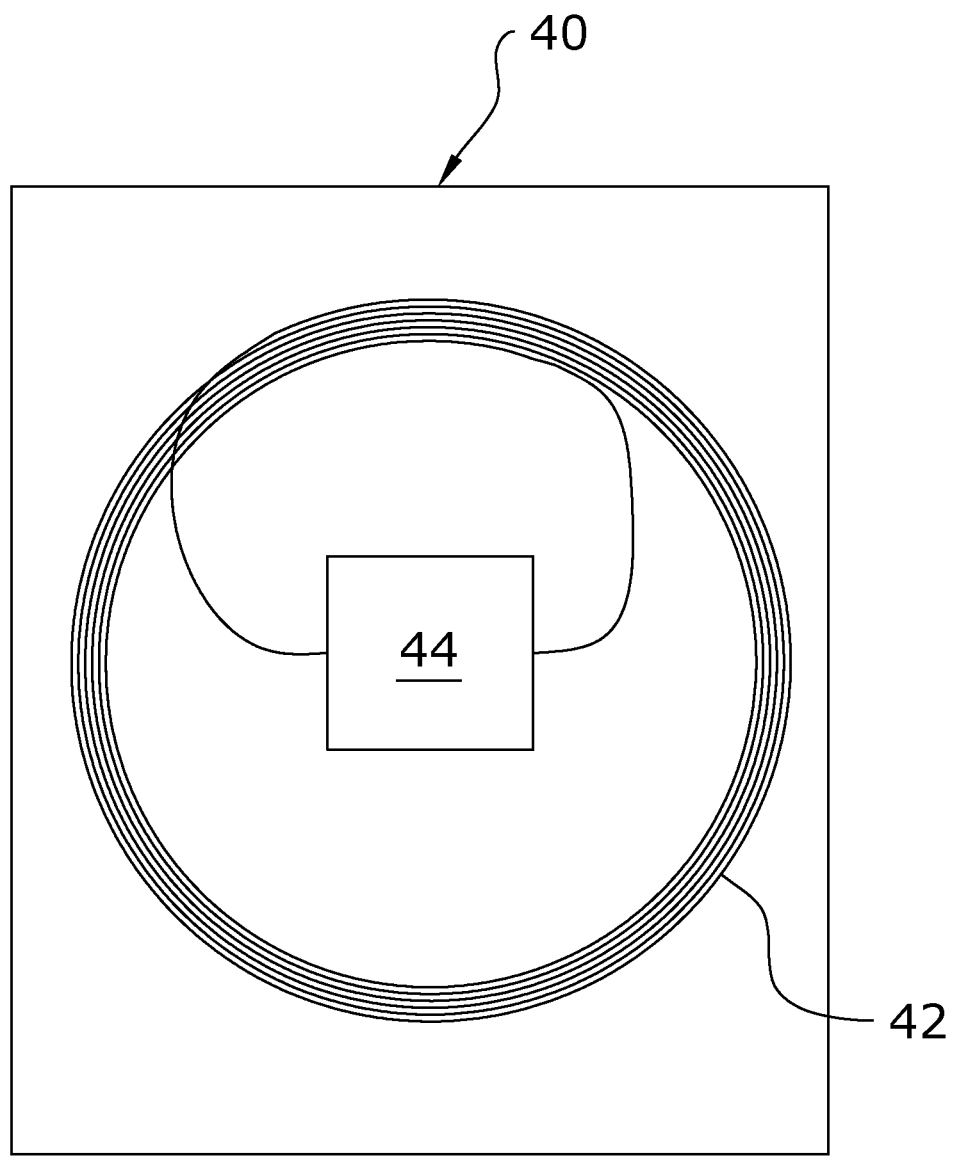
FIG. 15 is a front view of an interference tag comprised of an interference antenna electrically connected to an interference integrated circuit (IC).

As illustrated in FIG. 15, the interference tag 40 is comprised of an interference antenna 42 and an interference integrated circuit 44 (IC) electrically connected to the interference antenna 42 such as an RFID tag or NFC tag. The interference antenna 42 may be comprised of a wire looped a plurality of times around the interference integrated circuit as further shown in FIG. 15 of the drawings. The interference tag 40 further preferably includes a battery or capacitor to provide electrical power to the interference tag 40 which is commonly used in RFID tags. The interference tag 40 may be comprised of a unidirectional or bidirectional communication system. The interference tag 40 may also be comprised of a passive, semi-passive or active tag.

The interference IC 44 in the interference tag 40 is for storing and processing information, modulating and demodulating a radio-frequency (RF) signal, collecting DC power from reading signal received from the reader 12 and other functions. The interference IC 44 includes memory to store various types of data (e.g. fake identification data, fake security access data, fake payment data). The interference IC 44 also includes either a chip-wired logic or a programmed (or programmable) data processor for processing data received and to be sent.

The interference antenna 42 in the interference tag 40 is for receiving a radio signal from a reader 12 and/or transmitting a radio signal to the reader 12. With a passive tag technology, the interference antenna 42 also provides electrical power to the interference IC 44 which does not include a battery via magnetic induction between the interference antenna 42 and the reader 12 when the interference antenna 42 is located within the reading signal from the reader 12.

The interference tag 40 is configured to provide an interference signal approximately the same frequency as the data signal of the device tag 16 of the wireless device 14. For example, if the frequency of the data signal from the device tag 16 is 125 kHz, then the interference signal will also have a signal of 125 kHz or approximately the same. The interference tag 40 may also include fake data that is provided via the interference signal so that the reader 12 receives the fake data (e.g. a fake credit card number, fake identification, etc.) stored upon the interference tag 40 instead of the real data on the device tag 16 of the wireless device 14. The fake data stored on the interference tag 40 is different from the real data stored on the device tag 16. The fake data may be programmed by the manufacturer to be anything that the end user desires the fake data to be.

The interference tag 40 is preferably comprised of a low frequency radio-frequency identification integrated circuit and more particularly preferably comprised of a read/write low frequency radio-frequency identification integrated circuit that is programmable. The inventor has identified the ATA5577 read/write LF RFID IDIC 100 to 150 kHz manufactured by Atmel Corporation in San Jose, Calif. as a suitable interference tag 40 for the present invention that may be programmed for various different uses and applications that correspond to the device tag 16 in various types of wireless devices 14.

In the pivoting structure for the device holder 20 illustrated in FIGS. 1 through 5b of the drawings, the interference tag 40 is connected to the exterior surface 30 of the second portion 24 by the securing member 50 or other attachment device. The interference tag 40 may also be embedded directly within a wall of the device holder 20 (see FIGS. 10a through 12 and 14 of the drawings). The interference tag 40 may also be attached to the front surface of the device holder 20 (see FIG. 13 of the drawings).

While shielding material 32 is not required for the present invention, the usage of shielding material 32 is preferred since the shielding material 32 will weaken or prevent the data signal from being emitted by the device tag 16 when the wireless device 14 is adjacent to the shielding material 32. The shielding material 32 is preferably positioned between the receiver portion 34 of the device holder 20 and the interference tag 40, however, the interference tag 40 may be on the same side of the shielding material 32 as the receiver portion 34. It is further preferable that an insulating material such as plastic be positioned between the interference tag 40 and the shielding material 32 to prevent interference by the shielding material 32 with the interference signal from the interference tag 40.

When shielding material 32 is used, it is preferable that the shielding material 32 is closer to the wireless device 14 than the interference tag 40 when the wireless device 14 is positioned within the receiver portion 34 of the device holder 20 so that the interference tag 40 is not negatively affected by the shielding material 32 as illustrated in FIGS. 10a through 11a of the drawings. Hence, when the shielding material 32 is closer to the device tag 16 of the wireless device 14 than the interference tag 40, the shielding material 32 weakens the data signal from the device tag 16 without significantly affecting the interference signal from the interference tag 40. The shielding material 32 is closer to the wireless device 14 than the interference tag 40 when the wireless device 14 is positioned within the receiver portion 34.

F. Securing Member.

Figure 3:
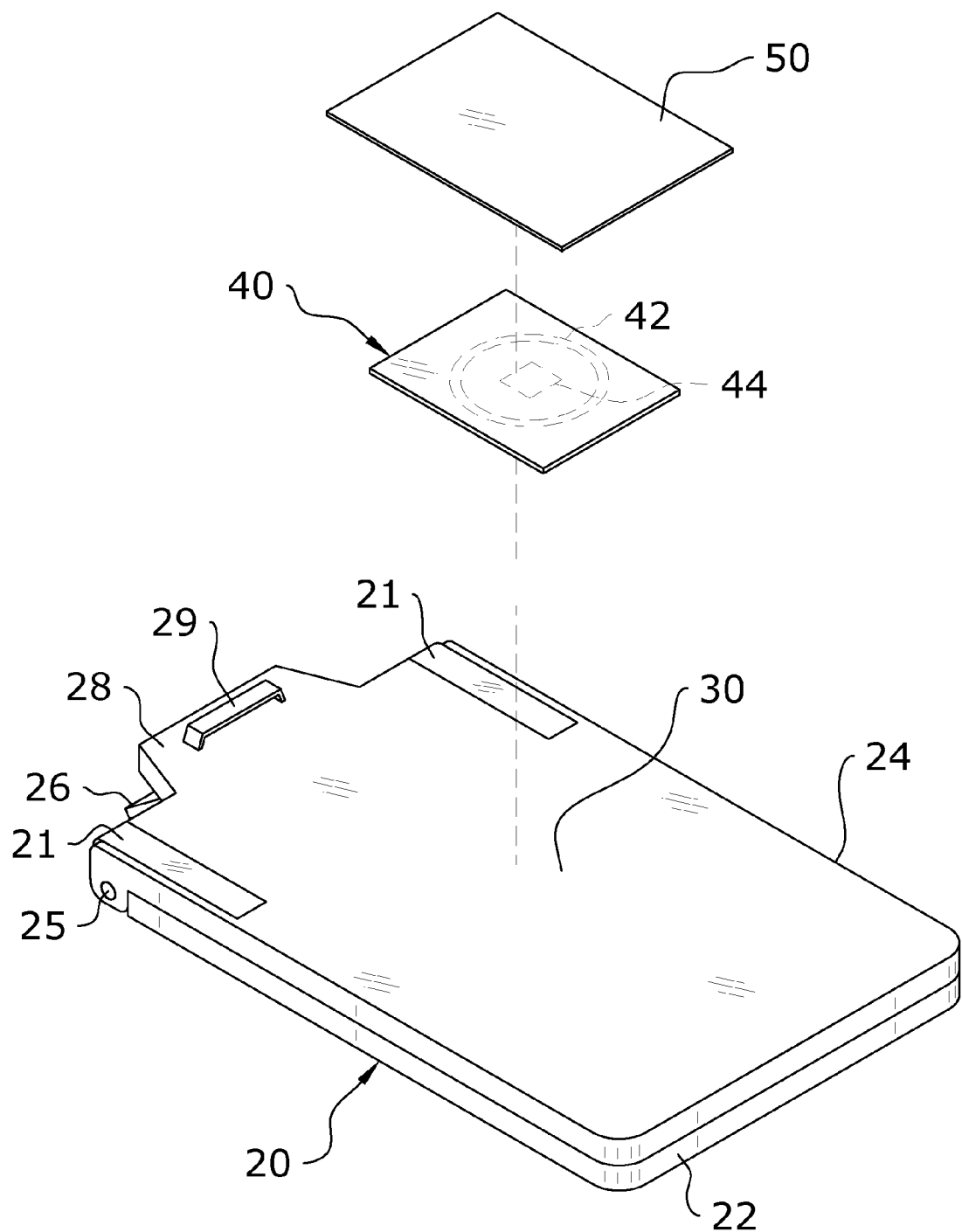
FIG. 3 is an exploded upper perspective view of FIG. 2b illustrating the interference tag and securing member.
Figure 4:
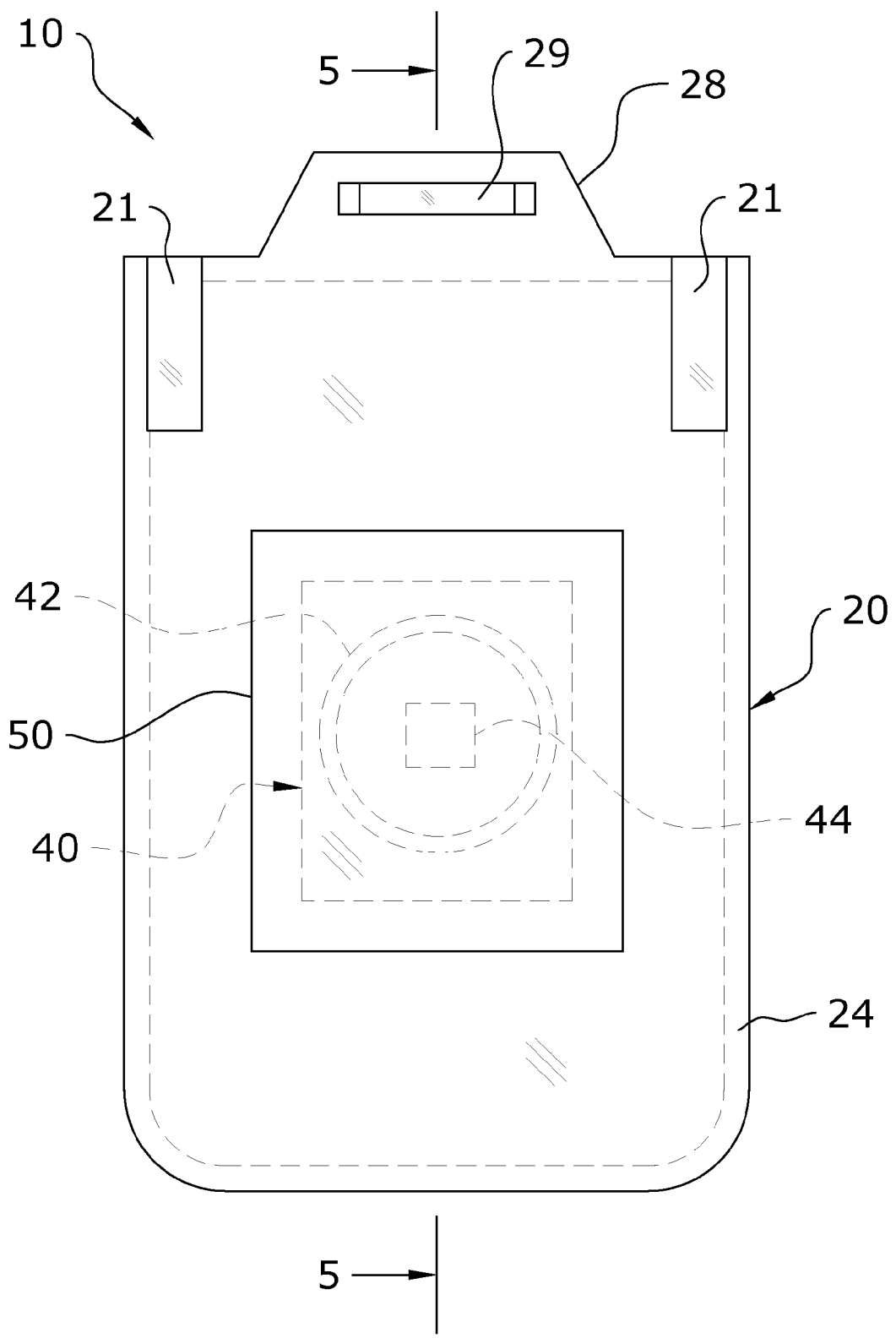
FIG. 4 is a rear view of the device holder with the interference tag attached.

As shown in FIGS. 2a through 5b, a securing member 50 having an adhesive on one side is used to secure the interference tag 40 to the exterior surface 30 of the device holder 20. The interference tag 40 may be integrally formed within the securing member 50 for attachment to the exterior surface 30 or the interference tag 40 may be separate from the securing member 50 as illustrated in FIG. 3 of the drawings. The exterior surface 30 may be the rear surface, interior surface, front surface or other surface of the device holder 20. The securing member 50 is preferably larger than the interference tag 40.

G. Operation of Preferred Embodiment.

In use, the user positions the wireless device 14 such as a proximity card within the receiver portion 34 of the device holder 20 adjacent to the shielding material 32 as illustrated in FIGS. 5a, 7, 10a, 11a, 12 through 14 of the drawings. With the wireless device 14 adjacent to the shielding material 32, if an unauthorized reader 12 attempts to read/scan the device tag 16 within the wireless device 14 no data signal will be sent by the device tag 16 or the data signal will be weakened because of the shielding material 32. If the reading signal and the data signal are low frequency signals, the reading signal from the reader 12 may provide enough electromagnetic energy to activate the device tag 16 with the device tag 16 providing a weak data signal. However, the interference tag 40 is positioned farther away from the shielding material 32 and receives the same reading signal and provides a stronger interference signal which is detected by the reader 12 instead of the weaker (or absent) data signal from the device tag 16 as illustrated in FIGS. 5a, 10a, 11a, 12, 13 and 14 of the drawings. The reader 12 will then read the fake data from the interference tag 40 instead of the real data from the device tag 16 thereby protecting the data on the wireless device 14. Alternatively, the reader 12 may not read any signal from either the device tag 16 or the interference tag 40 because the reader 12 is unable to determine which signal to read because both signals are on the same frequency.

Figure 10A:
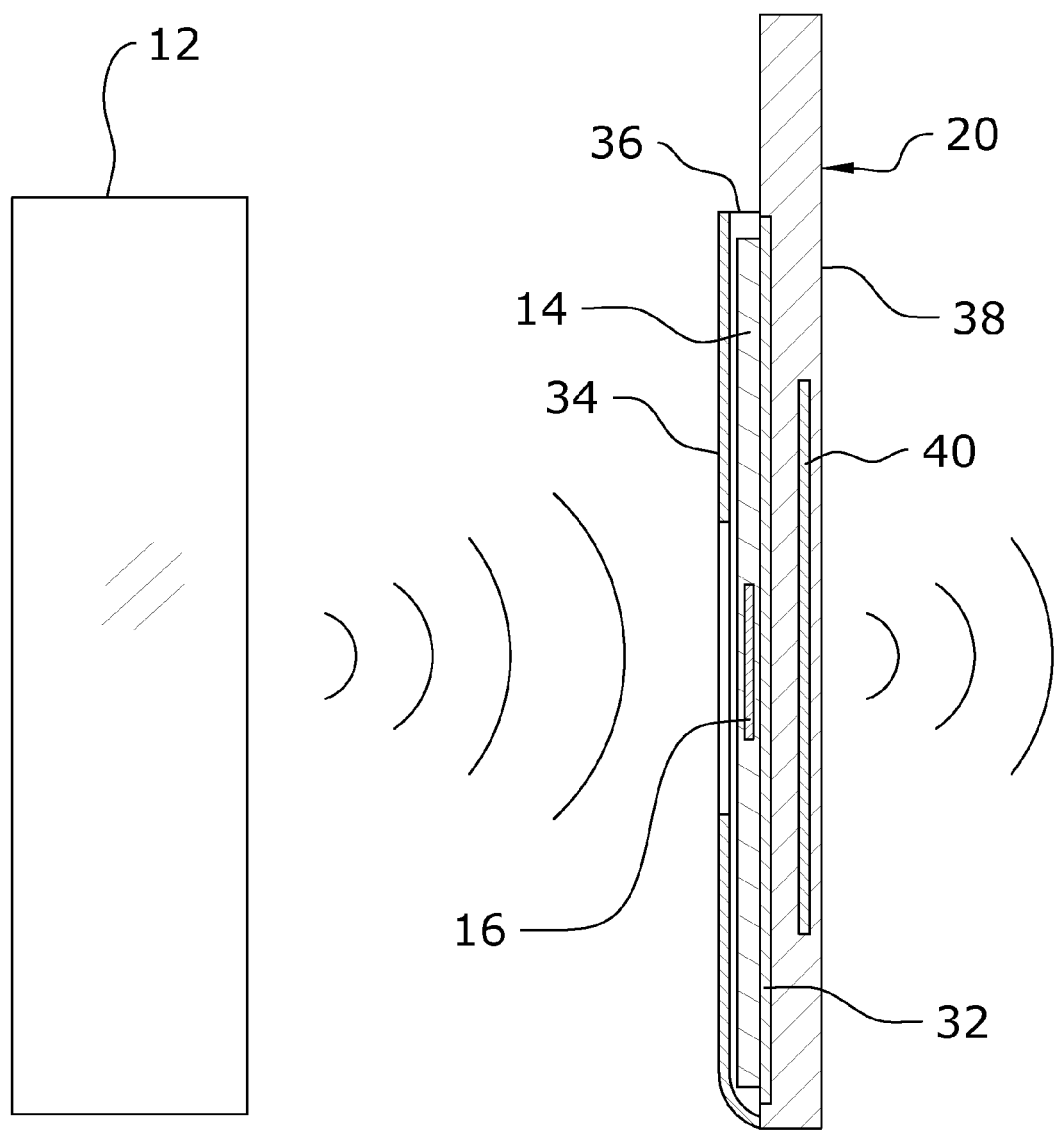
FIG. 10a is a cross sectional view taken along line 10-10 of FIG. 9 with the wireless device positioned within the device holder.
Figure 10B:
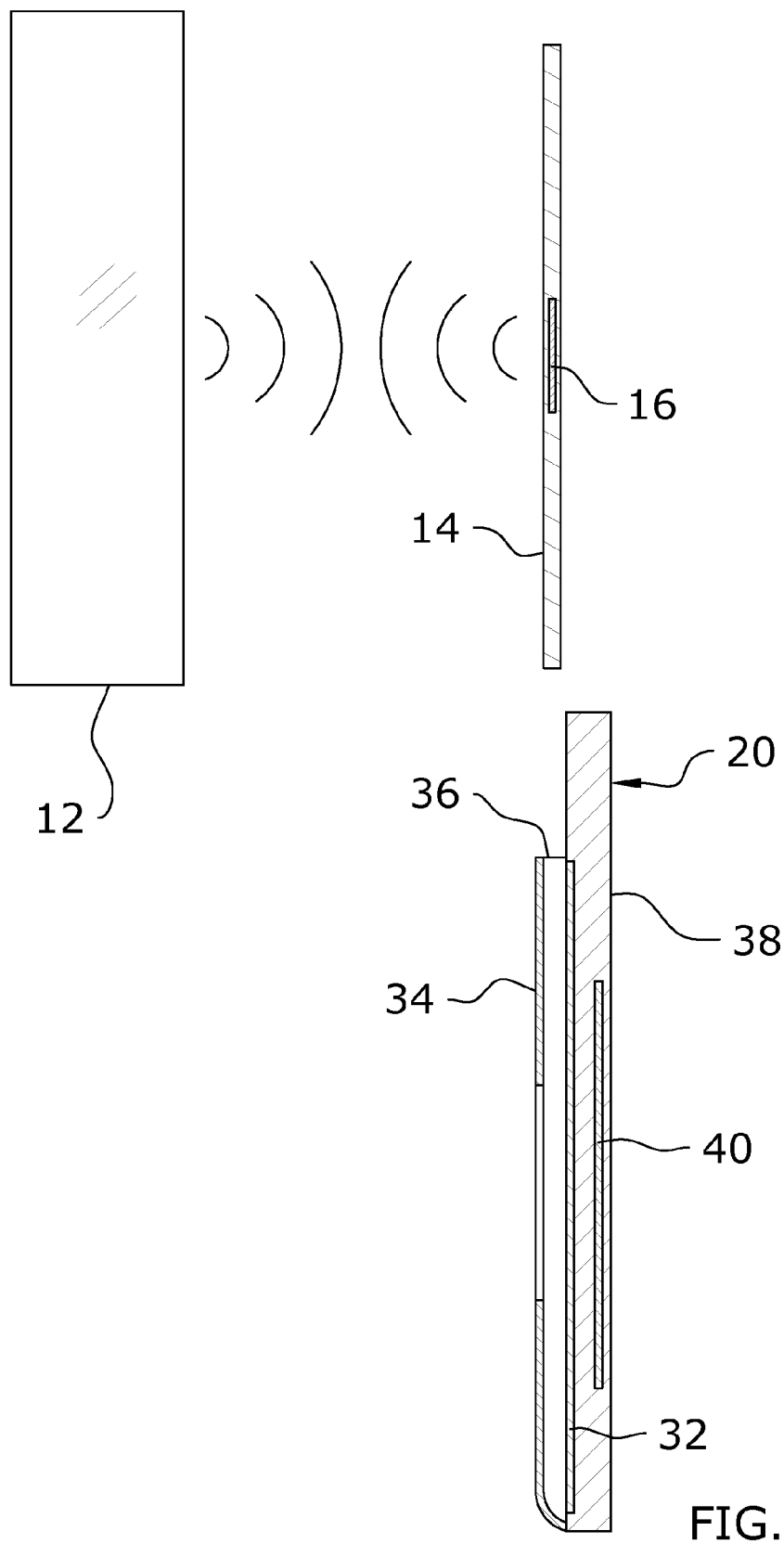
FIG. 10b is a cross sectional view taken along line 10-10 of FIG. 9 with the wireless device removed from the device holder for communicating with a reader.
Figure 11A:
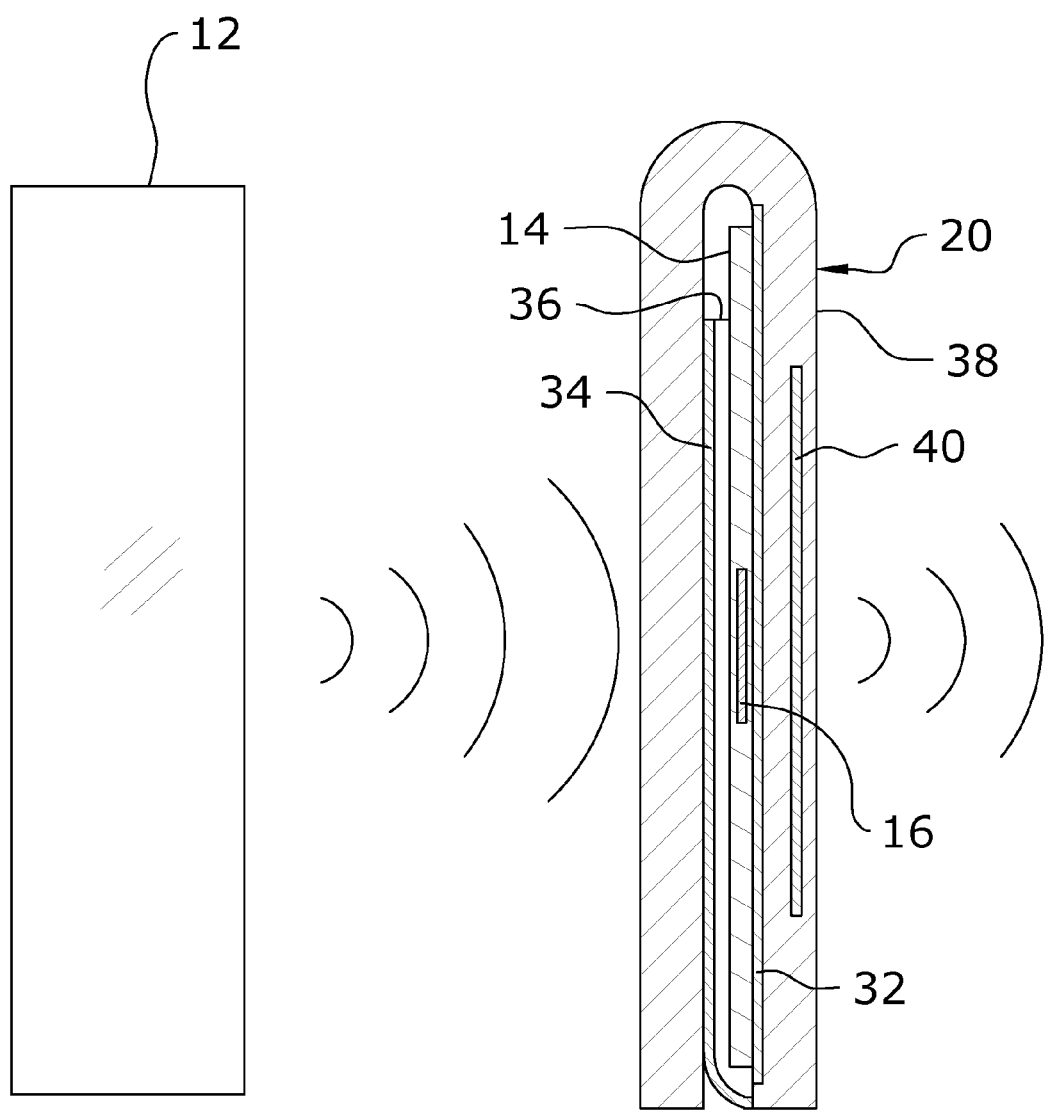
FIG. 11a is a side cutaway view of a second alternative device holder comprised of a wallet structure with the wireless device within the pocket of the wallet structure preventing communication between the wireless device and the reader.
Figure 11B:
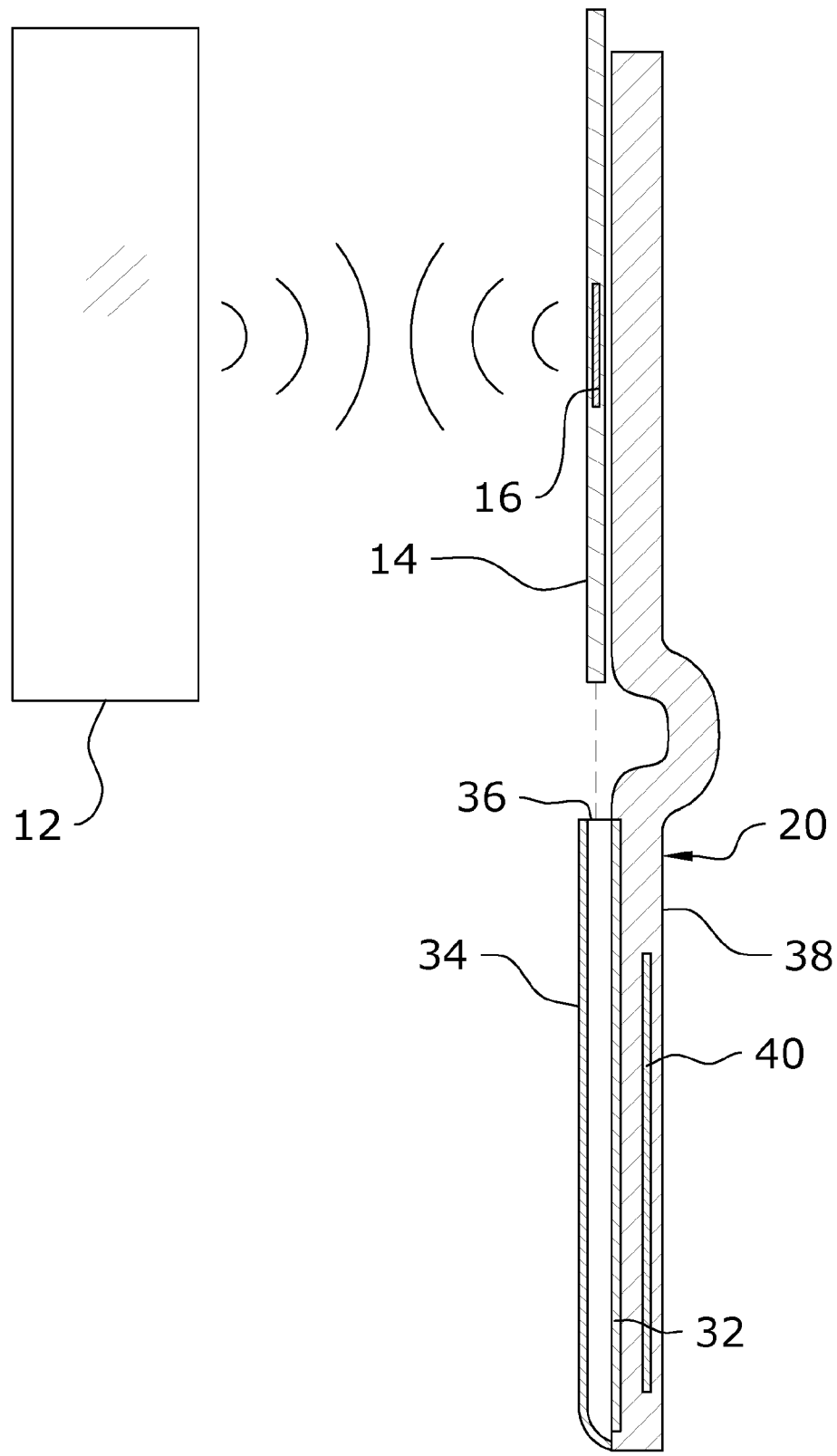
FIG. 11b is a side cutaway view of the second alternative device holder with the wireless device removed from the pocket for communicating with a reader.

If the user removes the wireless device 14 from the receiver portion 34 or otherwise moves the wireless device 14 outwardly away from the shielding material 32 (e.g. opening a wallet or pivoting the first portion 22 with the wireless device 14 away from the second portion 24 having the shielding material 32), then the device tag 16 is no longer detuned by the shielding material 32 and is able to communicate with a reader 12 sending a reading signal as illustrated in FIGS. 5b, 10b, 11b of the drawings. The reader 12 then receives the data signal from the device tag 16 and receives the real data to provide the desired function such as provide payment information, provide identification of the user, provide security access credentials and the like.

It is preferable that when the wireless device 14 is removed from the device holder 20 or otherwise moved away from the shielding material 32 that the interference tag 40 remains near the shielding material 32 which weakens the interference signal compared to the data signal emitted by the device tag 16 which is no longer detuned by the shielding material 32 (i.e. the interference signal is weaker than the data signal from the device tag 16 in this state so the reader 12 reads only the data signal from the device tag 16 and not the interference signal from the interference tag 40).

Once the user has performed the desired function with the wireless device 14, the user then repositions the wireless device 14 within the device holder 20 to continue protection of the data within the device tag 16 of the wireless device 14.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A wireless device security apparatus, comprising:
a device holder having a receiver portion, wherein said receiver portion is adapted to removably receive a wireless device, wherein said wireless device is adapted to transmit a data signal when said wireless device is positioned near a reader, wherein said data signal is readable by said reader; and
an interference tag connected to said device holder, wherein said interference tag transmits an interference signal when close to a reader;
wherein said device holder includes a shielding material positioned near said receiver portion, wherein said shielding material is comprised of a radio frequency shielding material, and wherein said shielding material is between said receiver portion of said device holder and said interference tag;
wherein said device holder is comprised of a first portion pivotally connected to a second portion, wherein said receiver portion is connected to the first portion of the device holder and wherein said receiver portion is comprised of a pocket having a receiver opening adapted to removably receive said wireless device;
wherein the shielding material is connected to the second portion of the device holder;
wherein said interference tag is connected to said second portion and wherein said first portion removably receives said wireless device;
wherein when said first portion is adjacent said second portion of said device holder said device tag is detuned by said shielding material;
wherein when a distal end of said first portion is pivoted outwardly away from said second portion of said device holder said device tag is no longer detuned by said shielding material and said device tag is able to communicate with said reader.

2. The wireless device security apparatus of claim 1, wherein said wireless device is comprised of a smart card.

3. The wireless device security apparatus of claim 1, wherein said wireless device includes a device tag.

4. The wireless device security apparatus of claim 3, wherein said device tag is comprised of a radio-frequency identification tag.

5. The wireless device security apparatus of claim 3, wherein said device tag is comprised of a near field communication tag.

6. The wireless device security apparatus of claim 1, wherein said interference tag is comprised of an interference antenna and an interference IC electrically connected to said interference antenna.

7. The wireless device security apparatus of claim 1, wherein said interference signal is approximately the same frequency as said data signal of said wireless device.

8. The wireless device security apparatus of claim 1, wherein said receiver portion is comprised of a pocket having a receiver opening.

9. The wireless device security apparatus of claim 1, wherein said device holder is comprised of a wallet or a sleeve.

10. The wireless device security apparatus of claim 1, wherein said device holder is comprised of a first portion pivotally connected to a second portion, wherein said interference tag is connected to said second portion and wherein said first portion removably receives said wireless device.

11. The wireless device security apparatus of claim 1, wherein said shielding material is closer to said wireless device than said interference tag when said wireless device is positioned within said receiver portion.

12. The wireless device security apparatus of claim 11, wherein said shielding material is comprised of a layer of metal.

13. The wireless device security apparatus of claim 1, wherein said interference tag is attached to an exterior surface of said device holder.

14. The wireless device security apparatus of claim 13, including a securing member having an adhesive, wherein said securing member secures said interference tag to said exterior surface of said device holder.

15. The wireless device security apparatus of claim 1, wherein said interference tag is embedded within a wall of said device holder.

16. The wireless device security apparatus of claim 1, wherein said interference tag is comprised of a low frequency radio-frequency identification integrated circuit.

17. The wireless device security apparatus of claim 1, wherein said interference tag is comprised of a read/write low frequency radio-frequency identification integrated circuit that is programmable.

18. The wireless device security apparatus of claim 1, wherein said radio frequency shielding material is comprised of metal.

19. A wireless device security apparatus, comprising:
a device holder having a receiver portion, wherein said receiver portion is adapted to removably receive a wireless device, wherein said wireless device is adapted to transmit a data signal when said wireless device is positioned near a reader, wherein said data signal is readable by said reader, wherein said wireless device includes a device tag, wherein said device tag is comprised of a radio-frequency identification tag or near field communication tag; and
an interference tag connected to said device holder, wherein said interference tag transmits an interference signal when close to a reader, wherein said interference tag is comprised of an interference antenna and an interference IC electrically connected to said interference antenna;
wherein said device holder includes a shielding material positioned near said receiver portion, wherein said shielding material is comprised of a radio frequency shielding material;
wherein said shielding material is between said receiver portion of said device holder and said interference tag;
wherein said radio frequency shielding material is comprised of metal;
wherein said shielding material is closer to said wireless device than said interference tag when said wireless device is positioned within said receiver portion;
wherein said device holder is comprised of a first portion pivotally connected to a second portion, wherein said receiver portion is connected to the first portion of the device holder and wherein said receiver portion is comprised of a pocket having a receiver opening adapted to removably receive said wireless device;
wherein the shielding material is connected to the second portion of the device holder;
wherein said interference tag is connected to said second portion and wherein said first portion removably receives said wireless device;
wherein when said first portion is adjacent said second portion of said device holder said device tag is detuned by said shielding material;
wherein when a distal end of said first portion is pivoted outwardly away from said second portion of said device holder said device tag is no longer detuned by said shielding material and said device tag is able to communicate with said reader.

20. A wireless device security apparatus, comprising:
a device holder having a receiver portion, wherein said receiver portion is adapted to removably receive a wireless device, wherein said wireless device is adapted to transmit a data signal when said wireless device is positioned near a reader, wherein said data signal is readable by said reader, wherein said wireless device includes a device tag, wherein said device tag is comprised of a radio-frequency identification tag or near field communication tag; and
an interference tag connected to said device holder, wherein said interference tag transmits an interference signal when close to a reader, wherein said interference signal is approximately the same frequency as said data signal of said wireless device, wherein said interference tag is comprised of an interference antenna and an interference IC electrically connected to said interference antenna;
wherein said device holder includes a shielding material positioned near said receiver portion, wherein said shielding material is comprised of a radio frequency shielding material;
wherein said shielding material is between said receiver portion of said device holder and said interference tag;
wherein said radio frequency shielding material is comprised of metal;
wherein said shielding material is closer to said wireless device than said interference tag when said wireless device is positioned within said receiver portion;
wherein said device holder is comprised of a first portion pivotally connected to a second portion, wherein said receiver portion is connected to the first portion of the device holder and wherein said receiver portion is comprised of a pocket having a receiver opening adapted to removably receive said wireless device;
wherein the shielding material is connected to the second portion of the device holder;
wherein said interference tag is connected to said second portion and wherein said first portion removably receives said wireless device;
wherein when said first portion is adjacent said second portion of said device holder said device tag is detuned by said shielding material;
wherein when a distal end of said first portion is pivoted outwardly away from said second portion of said device holder said device tag is no longer detuned by said shielding material and said device tag is able to communicate with said reader.

* * * * *